(12) United States Patent
Glad et al.

(10) Patent No.: US 8,217,118 B2
(45) Date of Patent: Jul. 10, 2012

(54) ACTIVATED SOLID SUPPORT AND METHOD

(75) Inventors: Gunnar Glad, Uppsala (SE); Jean-Luc Maloisel, Uppsala (SE); Nicolas Thevenin, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 1078 days.

(21) Appl. No.: 12/094,286

(22) PCT Filed: Nov. 22, 2006

(86) PCT No.: PCT/EP2006/011169
§ 371 (c)(1),
(2), (4) Date: May 20, 2008

(87) PCT Pub. No.: WO2007/062768
PCT Pub. Date: Jun. 7, 2007

(65) Prior Publication Data
US 2009/0048456 A1 Feb. 19, 2009

(30) Foreign Application Priority Data
Nov. 29, 2005 (SE) ...................................... 0502649

(51) Int. Cl.
*C07D 303/02* (2006.01)
*C07H 1/00* (2006.01)
*C08F 8/00* (2006.01)

(52) U.S. Cl. ..................... 525/194; 536/123.1; 536/124; 549/215

(58) Field of Classification Search .................. 549/215; 536/123.1, 124
See application file for complete search history.

(56) References Cited

U.S. PATENT DOCUMENTS
2005/0119449 A1 6/2005 Zeitler et al.

FOREIGN PATENT DOCUMENTS

| DE | 207 203 | 2/1984 |
| EP | 0 121 260 | 10/1984 |
| EP | 0 209 251 | 1/1987 |
| JP | 2002 053748 | 2/1990 |
| JP | 2003 267960 | 9/2003 |
| WO | WO 03/024588 | 3/2003 |

OTHER PUBLICATIONS

Yang et al , Studies on the Synthesis and Porperties of Hydroxyl Azacrown Ether-Grafted Chitosan , Journal of Applied Polymer Science , 2001, 82(8), p. 1838-1843.*
Arshady, R.: Chimica e L'Industria 70(9), 70-75 (1988).
Hjeretn, S.: Biochim Biophys Acta 79(2), 393-398 (1964).
Chanda, M.: Reactive Poiymers, 13(1-2), 103-119 (1990).
Wu, Z.: Carbon, 33(5), 607-616 (1995).

* cited by examiner

*Primary Examiner* — Taylor Victor Oh

(57) ABSTRACT

Disclosed is a method for activating a solid support material with epoxy groups and for immobilizing ligands thereon, utilizing phase transfer catalytic conditions. The method permits the introduction of epoxy groups and specific nucleophilic ligands on the support material with a high level of substitution. Furthermore, the invention provides a general method for immobilizing a ligand for use in a wide variety of chromatographic separation procedures such as ion exchange chromatography, hydrophobic interaction chromatography (HIC), reverse phase chromatography (RPC), or affinity chromatography.

20 Claims, No Drawings

ACTIVATED SOLID SUPPORT AND METHOD

CROSS-REFERENCE TO RELATED APPLICATIONS

This application is a filing under 35 U.S.C. §371 and claims priority to international patent application number PCT/EP2006/011169 filed Nov. 22, 2006, published on Jun. 7, 2007, as WO 2007/062768, which claims priority to patent application number 0502649-7 filed in Sweden on Nov. 29, 2005.

FIELD OF THE INVENTION

The present invention is directed to the field of chromatographic separation and relates particularly to a method for generating epoxy activated support materials and immobilising epoxide-containing ligands for use in chromatographic separation procedures.

BACKGROUND OF THE INVENTION

A major goal in any chemical or bioprocessing industry is the need to isolate and purify a product such as a protein from a complex mixture. Chromatography is well suited to a variety of uses in the field of biotechnology, since the technique is able to separate complex mixtures with great precision and is also suitable for more delicate products, such as proteins. Chromatographic separation matrices are designed to exploit the physical and chemical properties of the proteins of interest. For example, acidic proteins will interact and bind more strongly to ion exchange matrices having basic functionality and will therefore be retained by the matrix, and vice versa. The acidic proteins retained by the matrix can be subsequently removed or eluted by disrupting their interactions with the matrix. Another technique, affinity chromatography, exploits the unique biological specificity of a protein-ligand interaction. Affinity chromatography separations are not limited to protein purifications and the technique can be applied in principle where any particular ligand interacts specifically with a biomolecule. Substances that may be isolated by affinity chromatography include enzymes, antibodies, nucleic acids, hormones, etc. The concept is realised in practice by binding a ligand (or an ion exchange group) to an insoluble matrix. An impure mixture containing the protein to be separated is passed down a column packed with the matrix, where it will be adsorbed by the matrix. Adsorbed protein can then be eluted by altering the composition of the eluent so as to favour dissociation of the protein from the matrix.

Immobilisation of nucleophilic ligands, such as those containing amine, thiol or phenol groups, onto a solid support surface is conventionally performed by N-hydroxysuccinimide coupling or by direct opening of an epoxide immobilised onto the surface of the support (such as a gel) under aqueous conditions in presence of sodium hydroxide. Such methods can be successfully applied for the production of chromatographic media such as affinity matrices, where a low degree of substitution is required (typically ≦20 µmol/ml gel). In the case of ion exchange media, a higher degree of substitution is needed, suitably 80-150 µmol/ml. In this case, one of the methods of choice is based on the activation by bromination of immobilised allyl groups (see Scheme 1).

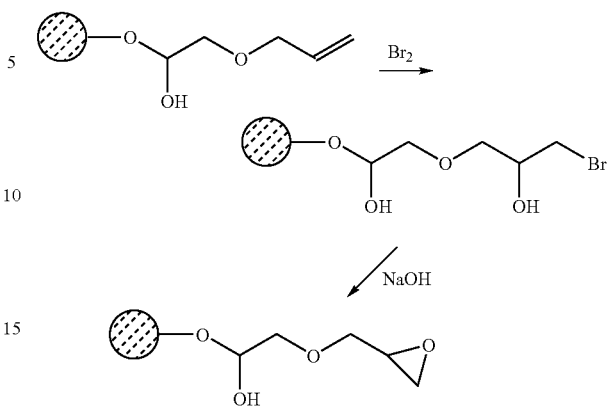

Scheme 1

The use of bromine is hazardous and, in production, the use of a specific reactor that is dedicated to this type of reaction is often necessary. Furthermore, whilst the coupling procedure via bromination is efficient and mainly yields glycerol derivatives as side product, undesirable side products of the process may be observed including traces of unreacted allyl groups, together with a few percent of bromine atoms on the solid support.

Accordingly, there is still a need for improved methods for the synthesis of activated support materials suitable for the attachment of ligands for affinity and ion exchange chromatography. Sundberg, L. et al, (J. Chromatography, (1974), 90, 87-98) describe the use of bis-oxiranes for the introduction of reactive oxirane groups into agarose gels by reaction of the agarose with 1,4-butanediol diglycidyl ether in aqueous sodium hydroxide solution containing sodium borohydride. The method fulfilled the dual function of bridging the gel strands by cross-linking as well as providing functionality for subsequent attachment of ligands to the matrix. Matsumoto, I. et al, (J. Biochem., (1979), 85, 1091-98) describe inter alia the preparation of epoxy-activated SEPHAROSE™ 4B beads with epichlorhydrin, followed by derivatisation of the activated SEPHAROSE™ into amino- and carboxy-agarose. These methods are efficient for cases where a substitution level below 50 µmol/ml of gel is required, but are unsuitable for separation media with higher substitution levels.

Hjertén, S., et al, (J. Chromatography, (1986), 354, 203-210) describe a method for the preparation of agarose derivatives by first coupling γ-glycidoxypropyl-trimethoxysilane in an aqueous medium to agarose via the trimethoxy groups, followed by attachment of (for example) alcohols in acetone or dioxane solution in the presence of boron trifluoride diethyl etherate as a catalyst. However, the catalyst is corrosive and requires specific handling precautions. Furthermore, separation media prepared by this method following immobilisation of a ligand, are unstable under basic conditions (pH>10), due to the presence of the silane moiety. This is not compatible with the practical use of these media in the process purification of biomolecules where cleaning in situ procedures using high pH (>12) are routinely employed.

A difficulty that may arise when carrying out nucleophilic substitution in heterogeneous reaction systems is that the reactants may not mix effectively. In such nucleophilic substitution reactions, the substrate is usually insoluble in water or other polar solvent, while the nucleophile is often an anion soluble in water but not in the organic solvent or substrate. Consequently, when the two reactants are brought together, their concentrations in the same phase are too low for convenient reaction rates. One way to overcome this is to use a solvent that will dissolve both species. Another way is to use a two phase system with a phase transfer catalyst. The present invention provides an alternative method for immobilising ligands and activating solid support materials with epoxy groups.

SUMMARY OF THE INVENTION

Our method utilises phase transfer catalytic conditions. In this method, a catalyst is used to "carry" the nucleophile from the aqueous phase into the organic phase, thereby permitting the introduction of epoxy groups and specific ligands on the support material with a high level of substitution. Furthermore, the method avoids the manipulation of bromine and at the same time eliminates unwanted side products resulting from incomplete reaction as noted above. The present method is advantageously applicable to all immobilisation methods where a high epoxide content or high ligand substitution is required in the separation matrix and is particularly suitable for the immobilisation of any nucleophilic ligands for use in a wide variety of chromatographic separation procedures, such as hydrophobic interaction chromatography (HIC), reverse phase chromatography (RPC) and multi-modal ion exchange chromatography.

DETAILED DESCRIPTION OF THE INVENTION

In a first aspect of the present invention, there is provided a method for preparing a separation matrix, the method comprising reacting together:
a) a matrix comprising the formula:

M-A-H wherein:
M is a solid support;
A is an atom or group selected from —O—, —S— and —NR$^1$—, where R$^1$ is selected from H and $C_1$-$C_4$ alkyl; and
b) a compound of formula:

X—(CH$_2$)$_r$—P, wherein:
X is selected from chloro, bromo, iodo, $C_1$-$C_4$ alkoxy, mesyl, tosyl and the group:

wherein R$^2$ is selected from H, $C_1$-$C_4$ alkyl, —COOR$^3$ and aryl; where R$^3$ is selected from H and $C_1$-$C_4$ alkyl;
P is H, or is a ligand selected from $C_1$-$C_{20}$ alkyl, $C_1$-$C_{20}$ alkenyl, $C_1$-$C_{20}$ carboxylic acid ester, $C_1$-$C_{10}$ alkoxy, $C_1$-$C_{10}$ alkenyloxy, $C_1$-$C_{10}$ carboxyalkyl, substituted amino, quaternary ammonium, $C_1$-$C_{20}$ monoether or polyether containing from 1 to 6 oxygen atoms, aryl, aryloxy, heteroaryl and aralkyloxy; or P is selected from the groups:

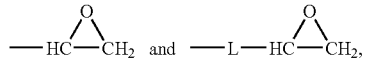

where L is a linking group and is a branched or unbranched chain of covalently linked atoms containing from 1-20 linear atoms selected from the group consisting of carbon, oxygen and sulphur atoms; and r is 0 or 1; characterised in that said method is performed in the presence of a phase transfer catalyst.

The present invention therefore relates to a method for the modification of a solid support material for use in a separation medium, said support material having attached thereto at least one and preferably a plurality of nucleophilic groups. The term "separation medium" is used herein for a material useful, for example, as packing of a chromatography column, and more specifically consists of one or more ligands coupled to a base matrix. Thus, the base matrix acts as a carrier, while the ligands provide functionalities that interact with target substances in chromatographic separation procedures. Reaction of said nucleophilic groups is performed under phase transfer conditions with a reactant comprising an electrophilic carbon centre. Suitably, the support material contains, or is derivatised to contain, at least one and preferably a plurality of the groups —OH, —SH and/or —NHR$^1$, where R$^1$ is selected from hydrogen and $C_1$-$C_4$ alkyl, preferably hydrogen. Preferably, A is —O—, such that the solid support contains or is derivatised to contain a plurality of hydroxyl groups covalently attached to the support.

Suitably, the method according to the first aspect is performed within the pH range of between pH 7 and pH 14. Preferably, the reaction is performed under basic conditions at a pH range of between 9 and 13 in a suitable solvent, for example, ethyl acetate, benzene, toluene, chloroform, dichloroethane, hexane, or diethyl ether. A preferred solvent for performing the method of the present invention is toluene. The reaction may be performed at a temperature that can vary between 0° C. and the reflux temperature of the chosen solvent, for between 30 minutes and 10 hours. Preferably the reaction is performed at a temperature in the range from about 20° C. to about 35° C. and from 1 to 4 hours.

Suitably, the separation matrix according to the first aspect may optionally include a counter-ion, which may be positive or negative to balance the formal charge (or charges) on the matrix. The nature of the counter-ion is not material to the invention and could be one of many known ions, such as $NH_4^+$, $K^+$, $Na^+$, trifluoroacetate ($F_3C$—$CO_2^-$), perchlorate ($ClO_4^-$), sulphonate ($SO_3^-$), phosphate ($PO_4^{3-}$), $Cl^-$, $Br^-$, or $I^-$.

In one embodiment according to the first aspect, there is provided a method for covalent attachment of a ligand to a solid support. In this embodiment, suitably a matrix comprising the formula:

M-A-H wherein M and A are hereinbefore defined, is reacted in the presence of a phase transfer catalyst with a compound of formula:

X—(CH$_2$)$_r$—P, wherein X is selected from chloro, bromo, iodo and the group:

wherein R$^2$ is selected from H, —COOR$^3$ and aryl; where R$^3$ is selected from H and $C_1$-$C_4$ alkyl;
P is a ligand selected from $C_1$-$C_{20}$ alkyl, $C_1$-$C_{20}$ alkenyl, $C_1$-$C_{20}$ carboxylic acid ester, $C_1$-$C_{10}$ alkoxy, $C_1$-$C_{10}$ alkenyloxy, $C_1$-$C_{10}$ carboxyalkyl, substituted amino, quaternary ammonium, $C_1$-$C_{20}$ monoether or polyether containing from 1 to 6 oxygen atoms, aryl, aryloxy, heteroaryl and aralkyloxy; and r is 0 or 1.

The term "ligand" is used herein in its conventional meaning for a chemical entity comprising a functional group capable of interaction with, and binding to a target substance. Such target substances may be either a compound, which it is desired to isolate or remove by chromatography, or alternatively an analytical target substance. Examples of groups of ligands include positively charged groups (anion exchange ligands); negatively charged groups (cation exchange ligands); lipid and hydrocarbon solubilising groups such as alkyl, aryl and aralkyl groups, and immobilised metal ions, for example Cu(II), Ni(II), Fe(II) and Fe(III) (for binding to polyhistidine tagged molecules).

Preferred ligand groups P may be selected from the group consisting of $C_1$-$C_{10}$ alkyl, perfluoro $C_1$-$C_{10}$ alkyl, $C_1$-$C_{10}$ carboxylic acid ester, $C_1$-$C_{10}$ alkoxy, $C_1$-$C_{10}$ carboxyalkyl, $C_1$-$C_{10}$ alkenyloxy, trimethoxysilylmethyl, phenyl, perfluoro-phenyl, phenoxy optionally substituted by halogen, $C_1$-$C_{10}$ alkoxy and phenyl, benzyloxy, 1-naphthyloxy, 2-furylmethyloxy and tri-$C_1$-$C_4$ alkylammonium.

In a second embodiment, a matrix comprising the formula:

wherein M and A are hereinbefore defined is reacted in the presence of a phase transfer catalyst with a compound of formula:

wherein X is selected from chloro, bromo, iodo and the group:

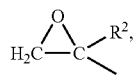

wherein $R^2$ is selected from H, —COOR$^3$ and aryl; where $R^3$ is selected from H and $C_1$-$C_4$ alkyl; and P is selected from the groups:

where L is hereinbefore defined and r is 0 or 1. This embodiment therefore provides an efficient method for covalent attachment of an epoxy group to the solid support material, thereby activating the support. The support may be further derivatised by reaction with one or more ligands having nucleophilic functional groups attached thereto. The method according to the present invention therefore allows the derivatisation of a solid support matrix with either a ligand directly, or with a reactive epoxy-functionality, in which case further reaction with a nucleophilic ligand is possible.

In a preferred embodiment, X is the group:

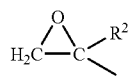

where $R^2$ is hydrogen; P is the group:

L is hereinbefore defined; and r is 0 or 1.

Suitably, "alkyl", "alkoxy", "alkenyl" and "alkenyloxy" groups according to the present invention may contain branched or unbranched chains of carbon atoms. Such alkyl, alkoxy, alkenyl and alkenyloxy groups may be unsubstituted or substituted by one or more of the groups —COOH, —SO$_3$H, —OH, —SH (and their protected forms, such as ester and ether), —NH$_2$, substituted amino, quaternary ammonium, tri-methoxysilyl and halogen. Suitably, substituted amino and quaternary ammonium are selected from respectively, —NR$^a$R$^b$ and —N$^+$R$^a$R$^b$R$^c$, where R$^a$, R$^b$ and R$^c$ are independently selected from hydrogen, $C_1$-$C_4$ alkyl, phenyl and benzyl. In the context of the present invention, it is to be understood that the groups —COOH and —SO$_3$H will include respectively the groups —COO$^-$ and —SO$_3^-$, since they are the ionised forms of the parent acids.

The term "aryl" is intended to represent an aromatic substituent containing one or two fused aromatic rings containing 6 to 10 carbon atoms, suitably phenyl or naphthyl. The aryl group may be optionally and independently substituted by one or more substituents, for example —SO$_3$H, —NH$_2$, quaternary ammonium, —OH, halogen, carbonyl including aldehyde and ketone, straight or branched chain alkyl groups containing 1 to 10 carbon atoms, cycloalkyl, phenyl and $C_1$-$C_{10}$ alkoxy, for example methoxy-, ethoxy-, propoxy- and n-butoxy-.

The term "heteroaryl" is intended to represent a mono-, bicyclic or tricyclic aromatic ring system selected from carbon atoms and containing at least one and no more than 4 heteroatoms which may be selected from N, O, and S. The heteroaryl group may be optionally and independently substituted by one or more substituents, for example —SO$_3$H, —NH$_2$, quaternary ammonium, halogen, straight or branched chain alkyl groups containing 1 to 10 carbon atoms, cycloalkyl, phenyl and $C_1$-$C_{10}$ alkoxy, for example methoxy-, ethoxy-, propoxy- and n-butoxy-. Examples of suitable heteroaryl ring systems with possible attachment points are shown in Table 1.

TABLE 1

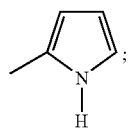

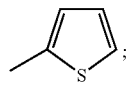

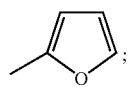

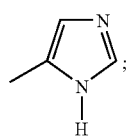

TABLE 1-continued

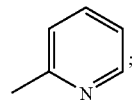

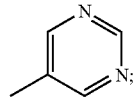

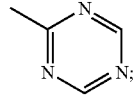

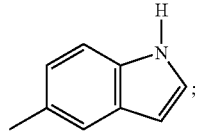

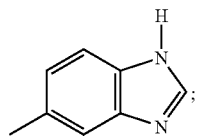

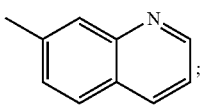

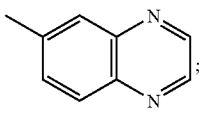

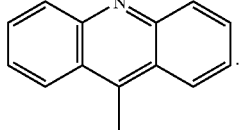

Alternatively, heteroaryl may be a purine or pyrimidine base residue selected from adenine, guanine, hypoxanthine, xanthine, thymine, uracil and cytosine and their derivatives.

Aralkyl is a $C_1$ to $C_6$ alkyl group substituted by an aryl or heteroaryl group. Examples include benzyl, phenylethyl and phenylpropyl groups.

The term "aralkyloxy" is intended to represent a $C_1$-$C_6$ alkoxy group substituted by an aryl or heteroaryl group as hereinbefore defined.

Halogen and halo groups are selected from fluorine, chlorine, bromine and iodine.

Linking group L is suitably a branched or unbranched chain of covalently linked atoms containing from 1-20 linear atoms selected from the group consisting of carbon, nitrogen, oxygen and sulphur atoms. Suitable linkers are selected from the group consisting of alkyl chains containing from 1 to 20 carbon atoms which may optionally include from 1 to 8 oxygen or sulphur atoms as mono(thio)ether or poly(thio) ether linkages. L may optionally include one or more ring structures interspersed in the chain of atoms, for example cyclohexylene and phenylene moieties. Branched linking groups may also be provided so as to include one or more epoxy-groups attached to carbon or nitrogen atoms of the chain and are suitable for the attachment of one or more additional ligand thereto. Examples of suitable linking groups (L) are shown in Table 2.

TABLE 2

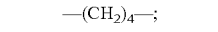
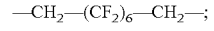
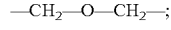
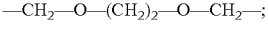
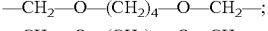
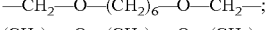
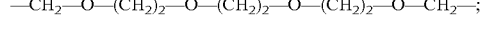

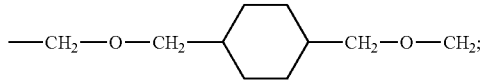

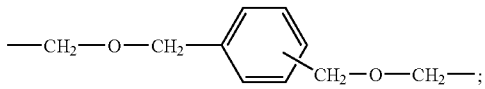

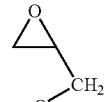

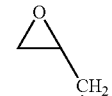

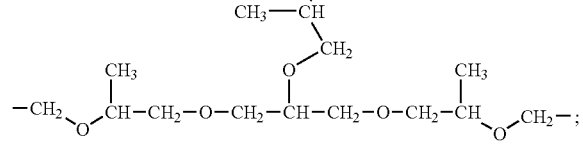

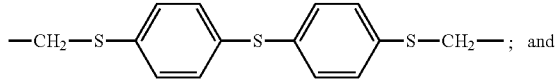

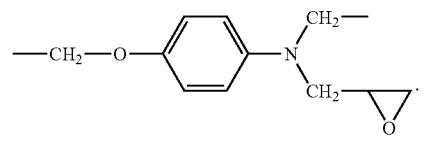

Preferably, L is selected from:

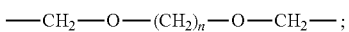

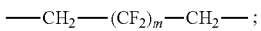

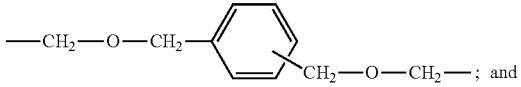

-continued

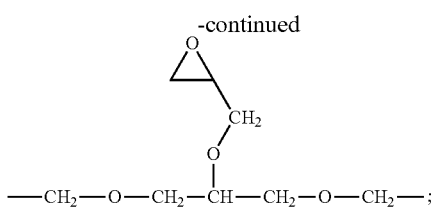

$—CH_2—O—CH_2—CH—CH_2—O—CH_2—$;

where n is an integer from 1 to 6 and m is an integer from 1 to 4. In a particular embodiment, L is $—CH_2—O—(CH_2)_n—O—CH_2—$ and n is 2, 3 or 4.

In a particular embodiment according to the invention, X is selected from chloro, bromo and iodo; P is aryl or heteroaryl and r is 1.

In a further embodiment, X is selected from chloro, bromo and iodo; P is the group:

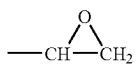

and r is 1.

In a further embodiment, X is the group:

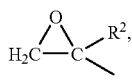

wherein $R^2$ is selected from H and $—COOR^3$, where $R^3$ is selected from H and $C_1$-$C_4$ alkyl; P is selected from $C_1$-$C_4$ alkyl optionally substituted with fluoro, aryl optionally substituted with fluoro, and ethenyl; and r is 0. Fluoro-substituted alkyl or aryl groups are preferably perfluoro $C_1$-$C_4$ alkyl, for example trifluoromethyl, and perfluorophenyl groups.

In a further embodiment, X is the group:

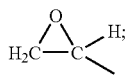

P is selected from $C_1$-$C_{10}$ alkyl, $C_1$-$C_{10}$ alkenyl, $C_1$-$C_{10}$ alkoxy, $C_1$-$C_{10}$ alkenyloxy, tri-$C_1$-$C_4$ alkylammonium, aryl, aryloxy, heteroaryl and aralkyloxy; and r is 1. Particularly preferred groups P are selected from phenoxy, benzyloxy, propoxy, prop-2-enyloxy, trimethylammonium, butyloxy, hexyloxy and octyloxy.

In an alternative procedure, the solid support material support may be derivatised with a ligand in a two step process, wherein in a first step the support is activated by attachment of an epoxy function to the support. In a second step of the process, the activated epoxy groups of the support material are further reacted with a ligand. Suitably, the ligand forms one component of a binding pair such that the support may be used as an ion exchange medium, or hydrophobic interaction chromatography (HIC), reverse phase chromatography (RPC), or affinity chromatography separation media. The ligand should contain, or be derivatised to contain, at least one functional group suitable for reaction with an epoxy group present on the solid support material, thereby forming a covalent bond with the support. It is to be understood that any molecules which possess a binding affinity for each other may be employed as ligands in the method of the present invention, such that the derivatised matrix material may be employed for binding to the complementary binding pair member.

The solid support material, M, employed in the separation matrix of the present invention, may be of any suitable material and may be a porous or a non-porous support. Preferably, the solid support material is a support particle or bead. In one embodiment, the support is comprised of a cross-linked carbohydrate material, such as agarose, agar, cellulose, dextran, chitosan, konjac, carrageenan, gellan, alginate etc. The support may easily be prepared according to standard methods, such as inverse suspension gelation (S Hjertén: Biochim. Biophys. Acta., (1964), 79(2), 393-398. Alternatively, the support is a commercially available product, such as SEPHADEX™ or SEPHAROSE™ FF (Amersham Biosciences AB, Uppsala, Sweden). Thus, in one embodiment of the present matrix, the support is a cross-linked polysaccharide. In a specific embodiment, the polysaccharide is agarose. Such carbohydrate materials having hydroxyl groups attached thereto may be employed in the method according to the invention. Alternatively, the solid support may be derivatised by methods that will be well known to the skilled person.

In an alternative embodiment, the support of the present separation matrix is comprised of cross-linked synthetic polymers, such as styrene or styrene derivatives, divinylbenzene, acrylamides, acrylate esters, methacrylate esters, vinyl esters, vinyl amides, or may be an inorganic material such as glass or silica. Preferably, the polymer is selected from the group consisting of polystyrene, polypropylene, polyvinyltoluene, polyacrylamide, polyacrylonitrile and polycarbonate. Supports of such polymers are easily produced according to standard methods, see e.g. "Styrene based polymer supports developed by suspension polymerization" (Arshady, R., Chimica e L'Industria, (1988), 70(9), 70-75). Alternatively, a commercially available product, such as SOURCE™ (Amersham Biosciences AB, Uppsala, Sweden) can be surface-modified according to the invention. However, in this embodiment, the surface of the support is preferably modified to increase its hydrophilicity, usually by converting the majority of the exposed residual double bonds to hydroxyl groups.

In further embodiments, the solid support can, for example, be a membrane, a filter, one or more chips, surfaces, capillaries, etc.

The solid supports containing hydroxyl groups may be derivatised with epichlorohydrin and the like or bis- or tris-epoxide containing derivatives to generate epoxy activated supports, which according to the method of the present invention, are performed by using a two phase system in the presence of a phase transfer catalyst. In a typical procedure, a support material, such as a gel, is pre-washed in an aliquot of the solvent in which the activation step is to be performed. A slurry of the gel in the organic solvent is then contacted with an aqueous solution of 50% NaOH containing the phase transfer catalyst. Suitable phase transfer catalysts may be selected from the group consisting of quaternary ammonium salts, for example, a tetra $C_1$-$C_8$ alkylammonium salt, phosphonium salts and crown ethers, for example, dicyclohexano-18-crown-6,1,4,7,10,13-pentaoxacyclopentadecane, or 1,4,7,10,13,16-hexaoxacyclooctadecane. After a few minutes the epoxy containing activation reagent is added to the mixture which is left to react at the desired temperature for a given time. The epoxy-activated slurry is obtained after washing, suitably with water, ethanol and finally with water. In particularly preferred embodiments, the phase transfer reaction is performed in toluene in the presence of tetrabutylammonium hydrogen sulphate at 25° C. for 4 hours. The procedure may be repeated advantageously to generate a higher level of activation of the support.

The activated support may be further derivatised with a nucleophilic ligand under conventional conditions, see for example, PCT application No. WO 2003/24588 (Maloisel, J-L and Thevenin, N.). As is well known, nucleophilic groups such as thiol or amine may be readily reacted with an epoxy modified support, while weaker nucleophiles such as hydroxy and alkoxy are reacted more slowly. See for example, Edwards, J. O and Pearson, R. G., J. Amer. Chem. Soc., (1962), 84, 16.

By the use of such a two phase reaction system, it is possible to obviate disadvantages in the conventional method which is performed directly in an aqueous media under basic conditions, without a phase transfer catalyst, since, due to competing partial hydrolysis, there results in low levels of activation which may only be overcome by using a large excess of activating reagent.

The method of the invention may also be employed for the direct immobilisation of an epoxy-group containing ligand, with the proviso that the organic reaction solvent may be advantageously chosen to suit the solubility of the ligand to be immobilised. Thus, the present method is particularly applicable for ligands with poor solubility in water, but good solubility in hydrophobic organic solvents and were high degree of ligand substitution is desired on the final solid support.

In a second aspect, the invention provides a support particle or bead produced according to the method as described herein.

EXAMPLES

The present examples are provided for illustrative purposes only, and are not to be construed as limiting the scope of the invention as defined by the appended claims.

1. Activation of SEPHAROSE™ with Epichlorhydrin 1.1 SEPHAROSE™ 6 FF (50 ml) was washed on a glass filter with ethanol (4×50 ml) and toluene (4×50 ml). Toluene (20 ml) was added and the resulting slurry added to a solution of 50% aqueous solution of NaOH (50 ml) containing 2 g of tetrabutylammonium hydrogen sulphate. After 2 minutes, epichlorohydrin (25 ml) was added and the mixture gently stirred at 25° C. for 3 hours. After washing with cold water (3×50 ml), ethanol (3×50 ml), and water (3×50 ml), the level of epoxidation of the gel (1A) was estimated by titration after coupling of mercaptopropionic acid, to be at least 257 µmol of epoxide/ml of gel.

1.2 Repeated activation: Epoxy-activated SEPHAROSE™ 6 FF obtained as described in Example 1.1 was washed on a glass filter with ethanol (4×50 ml) and toluene (4×50 ml). Toluene (20 ml) was added and the resulting slurry added to a solution of 50% aqueous solution of NaOH (50 ml) containing 2 g of tetrabutylammonium hydrogen sulphate. After 2 minutes, epichlorohydrin (25 ml) was added and the mixture gently stirred at 25° C. for 3 hours. After washing with cold water (3×50 ml), ethanol (3×50 ml) and water (3×50 ml) the level of epoxidation of the gel (1B) was estimated by titration after coupling of triethylamine, to be of at least 305 µmol of epoxide/ml of gel.

2. Activation of SEPHAROSE™ with Bispropoxy-Butane

SEPHAROSE™ 6 FF (50 ml) was washed on a glass filter with ethanol (4×50 ml) and toluene (4×50 ml). Toluene (20 ml) was added and the resulting slurry added to a solution of 50% aqueous solution of NaOH (50 ml) containing 2 g of tetrabutylammonium hydrogen sulphate. After 2 minutes bispropoxy-butane (25 ml) was added and the mixture gently stirred at 25° C. for 17 hours. After washing with cold water (3×50 ml), ethanol (3×50 ml) and water (3×50 ml) the level of epoxidation of the gel (1C) was estimated by titration after coupling of triethylamine, to be of at least 149 µmol of epoxide/ml of gel.

3. Activation of SEPHAROSE™ with Triglycidylglycerol

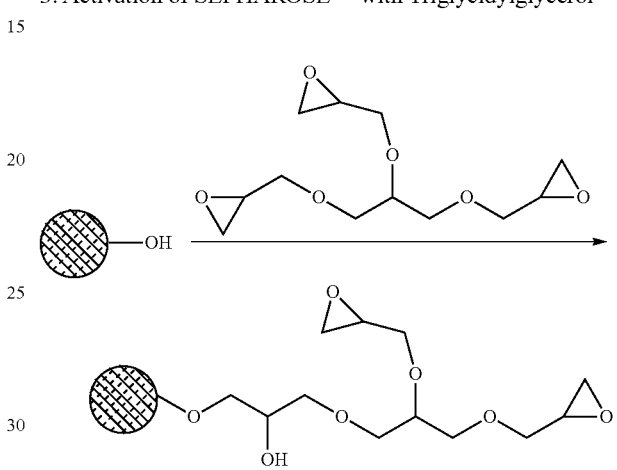

SEPHAROSE™ 6 FF (50 ml) was washed on a glass filter with ethanol (4×50 ml) and toluene (4×50 ml). Toluene (20 ml) was added and the resulting slurry added to a solution of 50% aqueous solution of NaOH (50 ml) containing 2 g of tetrabutylammonium hydrogen sulphate. After 2 minutes triglycidylglycerol (13 ml) was added and the mixture gently stirred at 25° C. for 3 hours. After washing with cold water (3×50 ml), ethanol (3×50 ml) and water (3×50 ml) the level of epoxidation of the gel (1D) was estimated by titration after coupling of triethylamine, to be of at least 78 µmol of epoxide/ml of gel.

4. Immobilisation of a Ligand on the Epoxy-Activated Support

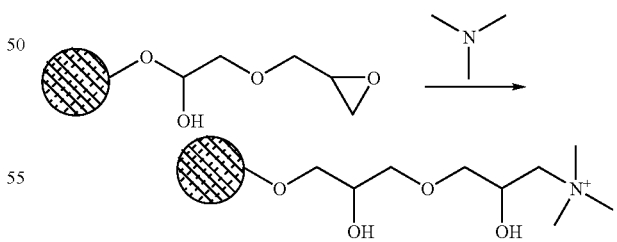

4.1 Immobilisation of Trimethylamine

Epoxy-activated SEPHAROSE™ (from Example 1B) (6 ml) was mixed with a 65% aqueous solution of trimethylammonium chloride (4 ml). The pH of the reaction mixture was adjusted to 11.8 using 50% aqueous NaOH and the mixture stirred at 50° C. overnight. The gel was washed with water (8×6 ml). Titration of the gel gave an ionic capacity of 305 µmol of amine/ml of gel.

4.2 Immobilisation of Mercaptopropionic Acid

A 50% aqueous solution of mercaptopropionic acid (10 ml) and 50% aqueous NaOH (10 ml) were added to epoxy-activated SEPHAROSE™ (from Example 1B) (6 ml). The mixture was stirred at 50° C. overnight. The gel was washed with water (8×6 ml). Titration of the gel gave an ionic capacity of 206 μmol of acid/ml of gel.

5. Immobilisation of an Epoxide-Containing Ligand on a Solid Support:

5.1 Immobilisation of Phenylglycidyl Ether on Sepharose™ 6 FF

SEPHAROSE™ 6 FF (50 ml) was washed on a glass filter with ethanol (4×50 ml) and toluene (4×50 ml). Toluene (20 ml) was added and the resulting slurry added to a 50% aqueous solution of NaOH (50 ml) containing 1 g of tetrabutylammonium hydrogen sulphate. After 2 minutes, phenylglycidyl ether (25 ml) was added and the mixture gently stirred at 25° C. for 6 hours. After washing with cold water (5×50 ml), ethanol (5×50 ml) and water (5×50 ml) the level of substitution of phenyl groups was determined by HR-MAS NMR to be of 156 μmol of phenyl/ml of gel.

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims.

The invention claimed is:

1. A method for preparing a separation matrix, said method comprising reacting together, in a two phase system:
  a) a matrix having the formula:

M-A-H wherein:
  M is a solid support;
  A is an atom or group selected from —O—, —S— and —NR$^1$—, where R$^1$ is selected from H and $C_1$-$C_4$ alkyl; and b) a compound of formula:

X—$(CH_2)_r$—P, wherein:
  X is selected from chloro, bromo, iodo, $C_1$-$C_4$ alkoxy, mesyl, tosyl and the group:

$H_2C$—C(R$^2$)(O), wherein R$^2$ is selected from H, $C_1$-$C_4$ alkyl, —COOR$^3$ and aryl; where R$^3$ is selected from H and $C_1$-$C_4$ alkyl;
  P is H, or is a ligand selected from $C_1$-$C_{20}$ alkyl, $C_1$-$C_{20}$ alkenyl, $C_1$-$C_{20}$ carboxylic acid ester, $C_1$-$C_{10}$ alkoxy, $C_1$-$C_{10}$ alkenyloxy, $C_1$-$C_{10}$ carboxyalkyl, substituted amino, quaternary ammonium, $C_1$-$C_{20}$ monoether or polyether having from 1 to 6 oxygen atoms, aryl, aryloxy, heteroaryl and aralkyloxy;
  and r is 0 or 1;
  characterised in that said method is performed in the presence of a phase transfer catalyst.

2. The method of claim 1, wherein:
  X is selected from chloro, bromo, iodo and the group:

$H_2C$—C(R$^2$)(O), wherein R$^2$ is selected from H, —COOR$^3$ and aryl; where R$^3$ is selected from H and $C_1$-$C_4$ alkyl;
  P is a ligand selected from $C_1$-$C_{20}$ alkyl, $C_1$-$C_{20}$ alkenyl, $C_1$-$C_{20}$ carboxylic acid ester, $C_1$-$C_{10}$ alkoxy, $C_1$-$C_{10}$ alkenyloxy, $C_1$-$C_{10}$ carboxyalkyl, substituted amino, quaternary ammonium, $C_1$-$C_{20}$ monoether or polyether having from 1 to 6 oxygen atoms, aryl, aryloxy, heteroaryl and aralkyloxy; and r is 0 or 1.

3. The method of claim 1, wherein X is selected from chloro, bromo and iodo; P is aryl or heteroaryl and r is 1.

4. The method of claim 1, wherein X is the group:

$H_2C$—C(R$^2$)(O), wherein R$^2$ is selected from H and —COOR$^3$, where R$^3$ is selected from H and $C_1$-$C_4$ alkyl;
  P is selected from $C_1$-$C_4$ alkyl optionally substituted with fluoro, aryl optionally substituted with fluoro, and ethenyl; and
  r is 0.

5. The method of claim 1, wherein X is the group:

$H_2C$—C(H)(O);

P is selected from $C_1$-$C_{10}$ alkyl, $C_1$-$C_{10}$ alkenyl, $C_1$-$C_{10}$ alkoxy, $C_1$-$C_{10}$ alkenyloxy, tri-$C_1$-$C_4$ alkylammonium, aryl, aryloxy, heteroaryl and aralkyloxy; and r is 1.

6. The method of claim 5, wherein P is selected from phenoxy, benzyloxy, propoxy, prop-2-enyloxy, trimethylammonium, butyloxy, hexyloxy and octyloxy.

7. The method of claim 1, wherein A is —O—.

8. The method of claim 1, wherein M is a support particle or bead.

9. The method of claim 1, wherein M is a porous solid.

10. The method of claim 1, wherein M is a non-porous solid.

11. The method of claim 1, wherein M is a cross-linked carbohydrate material.

12. The method of claim 11, wherein M is selected from the group consisting of agarose, agar, cellulose, dextran, chitosan, konjac, carrageenan, gellan and alginate.

13. The method of claim 12, wherein M is agarose.

14. The method of claim 1, wherein M is a synthetic polymer.

15. The method of claim 14, wherein M is formed from the group consisting of polystyrene, polypropylene, polyvinyltoluene, polyacrylamide, polyacrylonitrile, polycarbonate.

16. The method of claim 1, wherein M is selected from glass or silica.

17. The method of claim 1, wherein the phase transfer catalyst is selected from the group consisting of quaternary ammonium salts, phosphonium salts and crown ethers.

18. The method of claim 1, wherein the phase transfer catalyst is a tetra $C_1$-$C_8$ alkylammonium salt.

19. The method of claim 18, wherein the phase transfer catalyst is tetrabutylammonium hydrogen sulphate.

20. The method of claim 1, wherein the reaction is performed under basic conditions at a pH range of between 9 and 13.

* * * * *